(12) United States Patent
Corrodi et al.

(10) Patent No.: US 11,853,035 B2
(45) Date of Patent: Dec. 26, 2023

(54) CAMERA ASSISTED DOCKING SYSTEM FOR COMMERCIAL SHIPPING ASSETS IN A DYNAMIC INFORMATION DISCOVERY PROTOCOL ENVIRONMENT

(71) Applicant: Stoneridge Electronics AB, Solna (SE)

(72) Inventors: Brad Corrodi, Princeton, NJ (US); Milan Gavrilovic, Uppsala (SE)

(73) Assignee: Stoneridge Electronics AB, Solna (SE)

( * ) Notice: Subject to any disclaimer, the term of this patent is extended or adjusted under 35 U.S.C. 154(b) by 0 days.

(21) Appl. No.: 17/320,270

(22) Filed: May 14, 2021

(65) Prior Publication Data

US 2022/0253042 A1     Aug. 11, 2022

Related U.S. Application Data

(60) Provisional application No. 63/147,814, filed on Feb. 10, 2021.

(51) Int. Cl.
| | | |
|---|---|---|
| *G05B 19/4155* | (2006.01) | |
| *G06T 7/50* | (2017.01) | |
| *B64C 39/02* | (2023.01) | |
| *B64D 47/08* | (2006.01) | |
| *G08B 7/06* | (2006.01) | |

(Continued)

(52) U.S. Cl.
CPC ........ *G05B 19/4155* (2013.01); *B64C 39/024* (2013.01); *B64D 47/08* (2013.01); *G06T 7/50* (2017.01); *G08B 7/06* (2013.01); *H04N 7/181* (2013.01); *B64U 2101/30* (2023.01); *G05B 2219/40082* (2013.01);

(Continued)

(58) Field of Classification Search
None
See application file for complete search history.

(56) References Cited

U.S. PATENT DOCUMENTS 5,247,442 A      9/1993   Kendall
9,944,317 B2 *   4/2018   Lee ........................... G06T 7/20
(Continued)

FOREIGN PATENT DOCUMENTS

DE      102006035021        1/2008
EP         3639105 B1 *     5/2023   ............. B63B 49/00

OTHER PUBLICATIONS

International Search Report and Written Opinion for International Patent Application No. PCT/US2021/032359 completed on Oct. 5, 2021.

(Continued)

*Primary Examiner* — Gelek W Topgyal
(74) *Attorney, Agent, or Firm* — Carlson, Gaskey & Olds, P.C.

(57) ABSTRACT

A method for operating a commercial shipping asset includes entering one of a docking and an undocking mode of operations using a vehicle controller of a commercial shipping asset, identifying at least one trusted video source remote from the commercial shipping asset, determining a distance between the commercial shipping asset and at least one object based at least in part on an image analysis of a video feed from the trusted video source, and responding to the determined distance by providing at least one of a warning to an operator of the commercial shipping asset and adjusting an automated or semi-automated operation of the commercial shipping asset.

21 Claims, 5 Drawing Sheets

(51) Int. Cl.
*H04N 7/18* (2006.01)
*B64U 101/30* (2023.01)

(52) U.S. Cl.
CPC ............. *G06T 2207/10028* (2013.01); *G06T 2207/10032* (2013.01); *G06T 2207/20084* (2013.01)

(56) References Cited

U.S. PATENT DOCUMENTS

| | | | | |
|---|---|---|---|---|
| 10,281,924 | B2* | 5/2019 | Kasper | B62D 15/0285 |
| 10,471,992 | B2* | 11/2019 | Brennan | B62D 15/027 |
| 10,486,596 | B2 | 11/2019 | Rathi et al. | |
| 11,052,944 | B2* | 7/2021 | Kabos | G01S 17/42 |
| 11,067,993 | B2* | 7/2021 | Gali | B62D 13/06 |
| 11,269,359 | B2* | 3/2022 | Wieschemann | G05D 1/0212 |
| 2007/0027581 | A1* | 2/2007 | Bauer | B60W 30/08 701/1 |
| 2015/0382198 | A1* | 12/2015 | Kashef | H04L 67/303 726/5 |
| 2016/0052548 | A1 | 2/2016 | Singh et al. | |
| 2016/0063507 | A1* | 3/2016 | Gao | G06F 16/9554 705/302 |
| 2018/0127027 | A1* | 5/2018 | Brennan | G05D 1/0246 |
| 2018/0157270 | A1* | 6/2018 | Kasper | B62D 15/028 |
| 2018/0188738 | A1 | 7/2018 | Tatourian et al. | |
| 2018/0262789 | A1* | 9/2018 | Foulzitzis | H04N 21/4223 |
| 2018/0309651 | A1* | 10/2018 | Kim | G06F 21/552 |
| 2019/0019416 | A1 | 1/2019 | Perko | |
| 2019/0039425 | A1* | 2/2019 | Dodd | B60W 30/18036 |
| 2019/0064831 | A1* | 2/2019 | Gali | B60W 30/18036 |
| 2019/0064835 | A1* | 2/2019 | Hoofard | B60T 7/22 |
| 2019/0227555 | A1* | 7/2019 | Sun | B60Q 1/02 |
| 2019/0266897 | A1* | 8/2019 | Turato | G05D 1/0027 |
| 2019/0322367 | A1* | 10/2019 | El Idrissi | G08G 1/096822 |
| 2020/0004255 | A1* | 1/2020 | Mohammadiha | B60W 50/04 |
| 2020/0018076 | A1 | 6/2020 | Baur | |
| 2020/0178495 | A1* | 6/2020 | Womble | A01K 1/0353 |
| 2020/0233918 | A1* | 7/2020 | Mummadi | H04L 63/0815 |
| 2020/0393828 | A1* | 12/2020 | Hoofard | G06V 20/56 |
| 2021/0015087 | A1* | 1/2021 | Jimenez Tarodo | G06N 3/08 |
| 2021/0339740 | A1* | 11/2021 | Schomerus | B60W 30/06 |
| 2021/0347449 | A1* | 11/2021 | Dake | H04N 7/183 |
| 2022/0202294 | A1* | 6/2022 | Razmara | G01S 15/88 |

OTHER PUBLICATIONS

International Preliminary Report on Patentability for International Patent Application No. PCT/US2021/032359 dated Aug. 24, 2023.

* cited by examiner

CAMERA ASSISTED DOCKING SYSTEM FOR COMMERCIAL SHIPPING ASSETS IN A DYNAMIC INFORMATION DISCOVERY PROTOCOL ENVIRONMENT

CROSS-REFERENCE TO RELATED APPLICATION

This application claims priority to U.S. Provisional Application No. 63/147,814 filed on Feb. 10, 2021.

TECHNICAL FIELD

The present disclosure relates generally to commercial asset docking assist systems, and more particularly to a docking assist system incorporated into a dynamic information discover protocol environment.

BACKGROUND

Commercial shipping and transportation systems utilize multiple distributed assets to facilitate the movement of goods, or other shipments, from one location to another location. Multiple components work together to allow this movement, including tractors, trailers, cargo containers, cargo chassis, loading and unloading docks, etc. The disparate components are collectively referred to as assets. The grouping of all the assets working cooperatively to transport shipments is referred to as the ecosystem. Within the ecosystem some, or all, of the assets include sensor systems such as video cameras, radar systems, and the like. The sensor systems on any given asset are utilized to facilitate operations of that asset.

During the commercial shipping process, assets are loaded and unloaded at warehouses. In order to facilitate the loading and unloading process, warehouses and other receiving areas, including docking bays, are used. In a typical example a tractor trailer combination backs the trailer into a docking bay and aligns the rear of the trailer with a docking bay door, thereby allowing for efficient loading and unloading of cargo.

SUMMARY OF THE INVENTION

An exemplary method for operating a commercial shipping asset includes entering one of a docking and an undocking mode of operations using a vehicle controller of a commercial shipping asset, identifying at least one trusted video source remote from the commercial shipping asset, determining a distance between the commercial shipping asset and at least one object based at least in part on an image analysis of a video feed from the trusted video source, and responding to the determined distance by providing at least one of a warning to an operator of the commercial shipping asset and adjusting an automated or semi-automated operation of the commercial shipping asset.

In another example of the above described method for operating a commercial shipping asset identifying at least one trusted video source remote from the commercial shipping asset includes accessing a dynamic information discovery protocol and identifying the at least one trusted video source within the dynamic information discovery protocol.

In another example of any of the above described methods for operating a commercial shipping asset identifying at least one trusted video source remote from the commercial shipping asset includes deploying a remote video source from the commercial shipping asset.

In another example of any of the above described methods for operating a commercial shipping asset the remote video source includes at least one of an automated drone and a fixed position remote camera.

In another example of any of the above described methods for operating a commercial shipping asset determining the distance between the commercial shipping asset and the at least one object includes determining a shortest distance between the commercial shipping asset and the at least one object.

In another example of any of the above described methods for operating a commercial shipping asset determining the distance between the commercial shipping asset and the at least one object includes determining the distance between the object and the commercial shipping asset along an entire edge of the commercial shipping asset.

Another example of any of the above described methods for operating a commercial shipping asset further includes identifying at least one object in the video feed from the trusted video source using an image analysis tool.

In another example of any of the above described methods for operating a commercial shipping asset the image analysis tool includes a convolutional neural network analysis of the image feed.

In another example of any of the above described methods for operating a commercial shipping asset the image analysis tool omits classification of detected objects.

In another example of any of the above described methods for operating a commercial shipping asset responding to the determined distance comprises providing at least one of an auditory and a visual warning to an operator of the commercial vehicle asset when the determined distance is below a threshold distance.

In another example of any of the above described methods for operating a commercial shipping asset responding to the determined distance comprises automatically adjusting the at least one of the automated or semi-automated operation of the commercial shipping as set.

In another example of any of the above described methods for operating a commercial shipping asset determining the distance between the commercial shipping asset and the at least one object based at least in part on the image analysis of the video feed from the trusted video source is performed on one of the remote video source, the commercial shipping asset, and a remote processor communicatively coupled to the commercial shipping asset.

In one exemplary embodiment a commercial shipping asset includes an asset controller configured to discover and connect to at least one remote video source, the asset controller further including a memory storing instructions for causing the controller to identify at least one trusted video source remote from the commercial shipping asset, determine a distance between the commercial shipping asset and at least one object based at least in part on an image analysis of a video feed from the trusted video source, and respond to the determined distance.

In another example of the above described commercial shipping asset the remote video source is a component of the commercial shipping asset and is configured to provide a fixed field of view.

In another example of any of the above described commercial shipping assets the remote video source is a distinct asset from the commercial shipping asset, and wherein both the commercial shipping asset and the remote video source are within a dynamic information discovery protocol environment.

In another example of any of the above described commercial shipping asset the assets controller includes at least one of an automated docking system and a semi-automated docking assist system, and wherein the controller is configured to adjust operations of the one of the automated docking system and the semi-automated docking assist system in response to the determined distance.

In another example of any of the above described commercial shipping asset the assets controller further includes an image analysis tool configured to identify the at least one object in the video feed without the utilization of historical positioning.

In another example of any of the above described commercial shipping assets the image analysis tool is a convolutional neural network.

In another example of any of the above described commercial shipping assets the image analysis tool omits classification of identified objects.

These and other features of the present invention can be best understood from the following specification and drawings, the following of which is a brief description.

DETAILED DESCRIPTION

Figure 1:
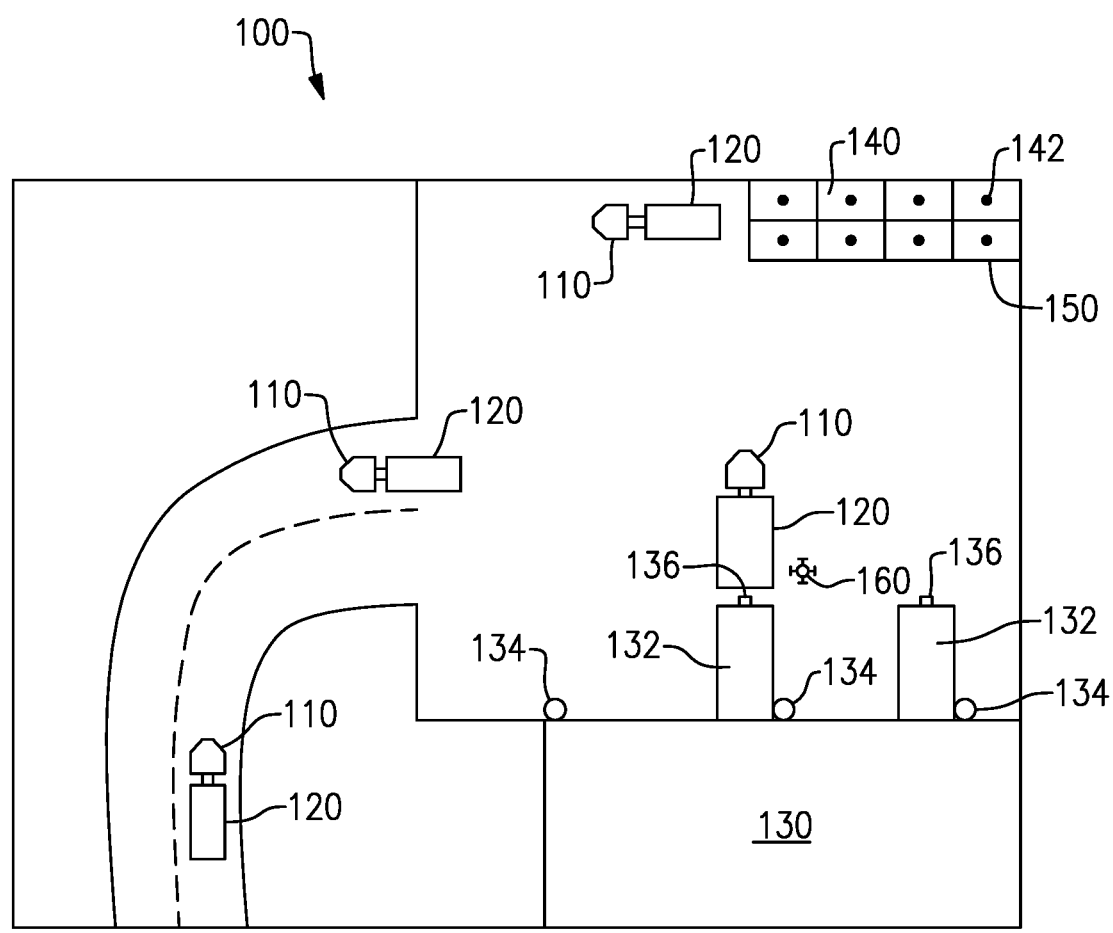
FIG. 1 illustrates an exemplary commercial shipping ecosystem.

FIG. 1 schematically illustrates an exemplary commercial shipping ecosystem 100 according to a first example. The exemplary ecosystem 100 is a warehouse shipping and receiving lot. In alternative examples, the ecosystem 100 can include a highway with multiple trucks, a railyard, a shipyard, an airport, or any similar environment. The commercial shipping ecosystem 100 includes multiple assets, such as tractors 110, trailers 120, a building 130 including loading docks 132, containers 140, and chassis 150 supporting the containers 140. In other ecosystems, additional or alternative assets can be included within the ecosystem.

Some, or all, of the assets 110, 120, 130, 140, 150 includes sensors such as video cameras 134, GPS monitors 142, radar or lidar based proximity sensors 136 and the like. Each of the sensors is connected to a controller within the asset on which the sensor is mounted. The sensors then assist the asset performing some autonomous function or monitoring function. In some examples additional sensing systems, such as a drone 160, carrying a video camera can be deployed to supplement one or more of the asset sensors. In such examples, the drone 160 is considered to be part of the asset that deployed the drone 160.

Figure 2:
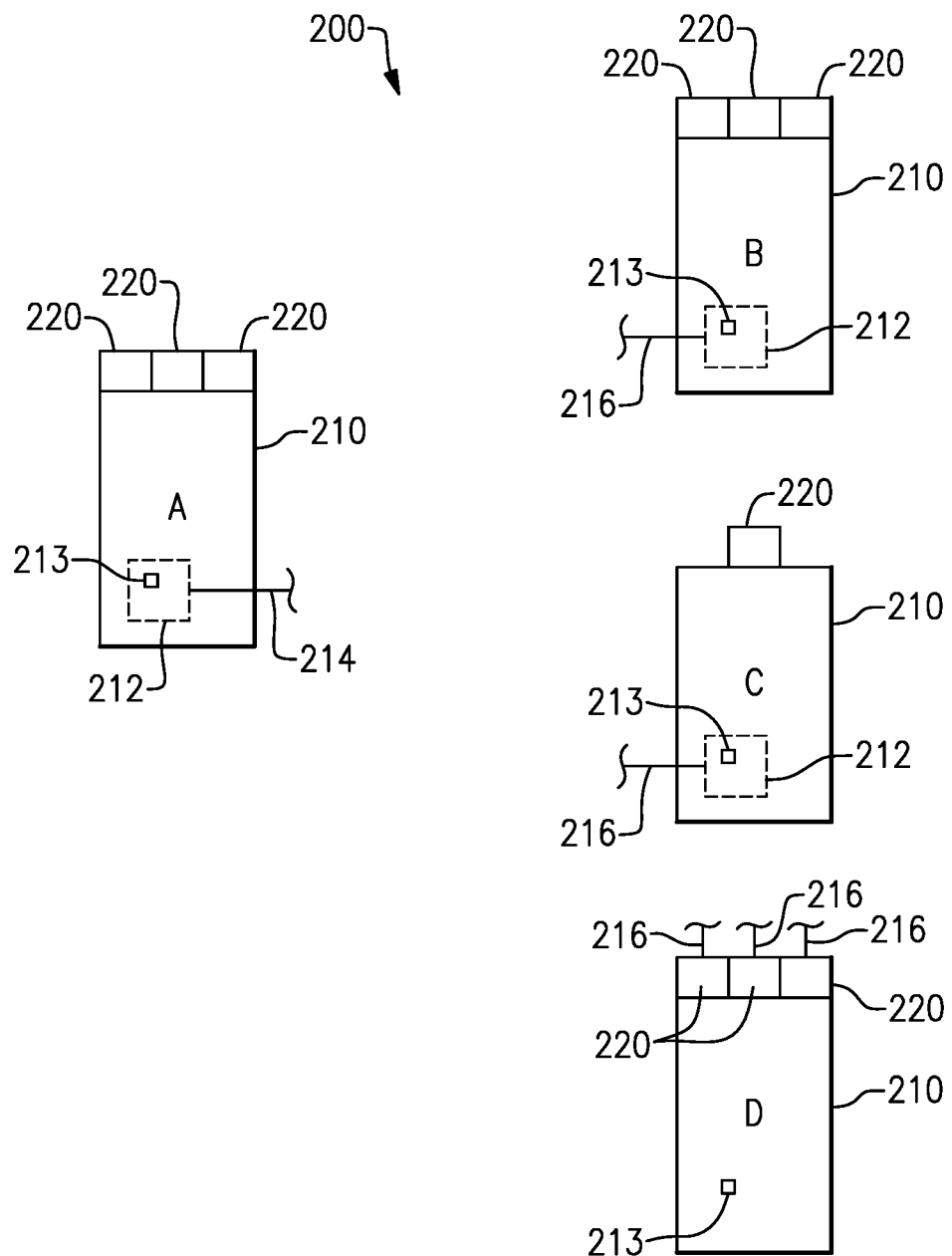
FIG. 2 schematically illustrates a highly schematic representation of an exemplary ecosystem including a dynamic information discovery protocol.
Figure 3:
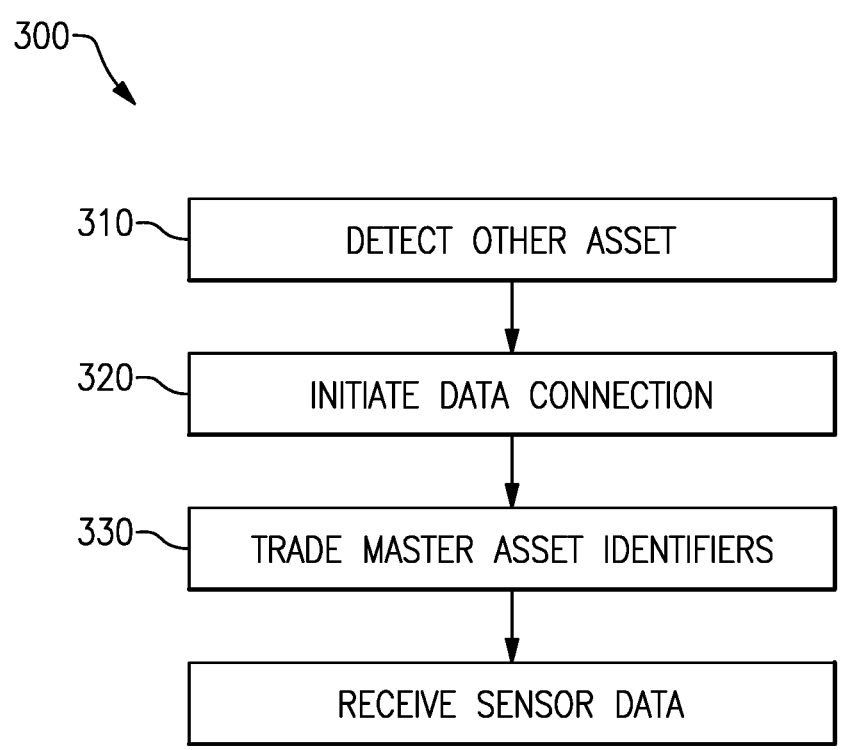
FIG. 3 illustrates a high level example operation of the dynamic information discovery protocol.

With continued reference to the ecosystem 100 of FIG. 1, FIG. 2 illustrates a highly schematic generic ecosystem 200 in which one or more assets 210 within the ecosystem 100 are able to utilize sensor information from another of the assets 210 within the ecosystem 100 via a dynamic information discovery protocol.

The first asset 210 (A) includes a controller 212 with a receiver 214. Each asset 210 also includes one or more sensors 220. As described above, the sensors 220 can include proximity sensors, video cameras, or any other relevant sensor type. The receiver 214 is configured to receive data broadcast from the other assets 210, each of which includes a transmitter 216 from a controller 212 or a sensor 220 disposed on the asset 210. In one example, every asset 210 has a transmitter and a receiver.

In some examples, the assets 210 constantly transmit the data via the transmitters 216 and any other asset 210 is able to receive the transmitted data. In alternative examples the controllers 212 communicate with each other and establish authorization for the first asset 210 to utilize data provided by the second asset 210. In yet other examples, some assets 210 can continuously transmit data while others require authorization. In yet further examples, one or more assets can further include passive identifiers instead of active transmissions when the asset 210 does not include sensors or a controller.

To facilitate the communications and provision of data between assets 210, as well as universal registration between assets 210, each of the controllers 212 is part of a dynamic information discovery protocol that allows one intelligent asset 210 in the ecosystem to discern the presence of another asset 210 and query a range of sources to discern relevant information attributes of the other asset 210 in order to support a subsequent coordinated interaction with the other asset 210. Each controller 212, or asset 210 not including a controller 212, includes a master asset identifier 213. The master asset identifier 213 is a globally unique identifier assigned by the protocol to each asset 210 registered within the ecosystem 100. In some examples, the master asset identifier can be globally unique across multiple ecosystems. By way of example, vehicles or other assets that travel between ecosystems 100, 200 include master asset identifiers that are unique across all ecosystems in which the asset 210 is expected to operate. Assets 210 using a passive asset identifier can, in some examples, utilize a QR code or other computer readable plaque to identify a universal resource locator (URL) where the full master asset identifier can be retrieved by controllers on smart assets 210.

In addition to uniquely identifying the asset 210, the master asset identifier 213 defines attributes of the asset 210. In one example, the master asset identifier 213 defines metadata of the asset 210 including a manifest of the data elements that the asset 210 has available, and from what source(s) the data in the asset 210 is derived. The metadata can include both static and dynamic elements. The metadata further assists other assets 210 in identifying what sensor data to use from an asset and in determining how to use that data.

For the purposes of the following example discussion, asset 210 (A) is referred to as the first asset and is the asset initiating a query and asset 210 (B) is referred to as the second asset and is the asset being queried. It should be appreciated that practical operations can include any of the assets 210 operating as the first asset, and any of the assets 210 operating as the second asset, and that the scale of a particular ecosystem 100, 200 can include any number of assets 210 operating as either the first asset 210 (A) or the second asset 210 (B). In yet further examples one or more of the assets 210 can be a combined set of multiple assets currently registered in the dynamic information discovery protocol as single asset (e.g. a tractor/trailer combination).

By incorporating the dynamic information discovery protocol in each asset, or a subset of assets, within an ecosystem, the assets can utilize methods and operations that improve the speed, efficiency, safety, and traceability of various operational processes within the ecosystem. One such application is a docking or undocking process.

With continued reference to the dynamic information discovery protocol environment described above and illustrated in FIGS. 1-3, FIG. 4 schematically illustrates an exemplary docking maneuver in which a tractor 410 and trailer 420, operating as single asset 402, approach a loading dock 430 using an automated or semi-automated system stored in a controller 412 of the tractor 410. Also present in the environment are one or more hazards 450. The hazards 450 are, in some examples, people or animals that can be subject to injury if a collision were to occur. In other examples, the hazards 450 can be trees, light posts, and other fixed inanimate objects that can cause damage to the tractor 410 and the trailer 420 in the event of a collision. In yet further examples, the hazards 450 can be a combination of both people or animals and inanimate objects.

During the automated or semi-automated docking operation, the controller 412 is configured to adjust operations, or otherwise account for, detected objects 450 and detected docking bay features. In some docking maneuvers some or all of the hazards 450 and at least a portion of the docking bay features are obscured from the onboard cameras of the tractor 410 and the trailer 420 resulting in the automated or semi-automated docking system being unable to adjust the maneuvers to account for the obscured hazard 450. In addition, the automated or semi-automated docking system uses object detection within the image to detect the relative positions of the loading docks 430 and the trailer 420.

Figure 4:
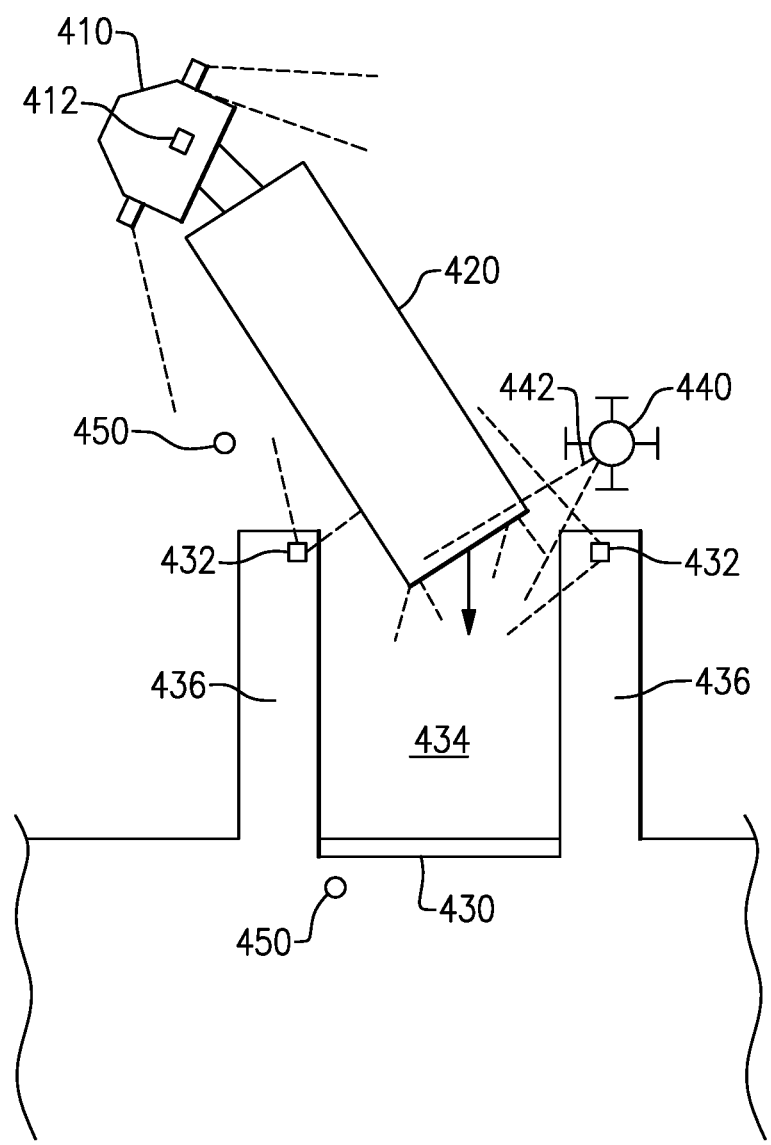
FIG. 4 illustrates an exemplary tractor trailer combination engaging in a docking maneuver within a dynamic information discovery protocol environment.
Figure 5:
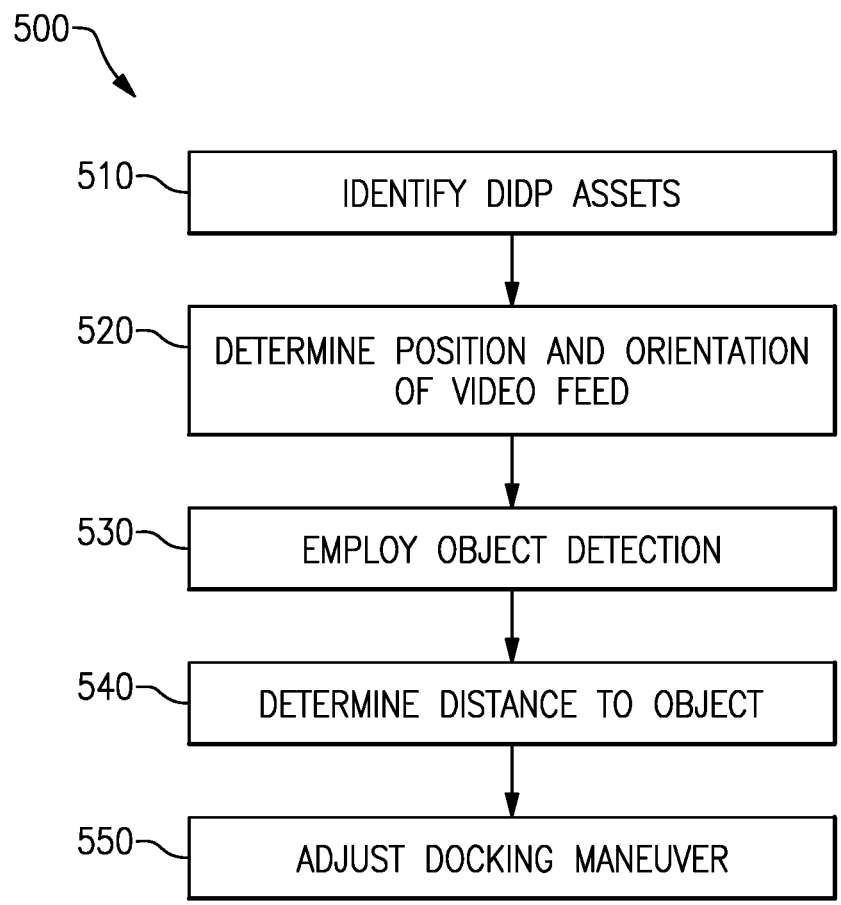
FIG. 5 illustrates an exemplary method for docking a trailer according to one embodiment.

The dynamic information discovery protocol environment allows the controller 412 to be able to use video sources from other assets, such as the loading bay 430, to determine the presence of hazards 450 that may not be visible to the video cameras onboard the tractor 410 or trailer 420. With continued reference to FIG. 4, FIG. 5 illustrates a method 500 for utilizing video cameras, or other sensors, remote from the tractor 410 and the trailer 420, to assist in the docking maneuver illustrated in FIG. 4.

Initially the controller 412 uses the dynamic information discovery protocol to identify another asset including a video feed of the docking bay, within the environment in an "Identify DIDP Assets" step 510. In one example, the asset can be the loading dock 430 which includes two cameras 432 each of which provides a view of the loading bay 434. In another example, the asset can include a drone 440 supporting a camera 442 that can be adjusted to provide a full view of the loading bay 434. In yet other examples, any other asset providing video feed with a view of the trailer 420 and/or the loading bay 434 and within the dynamic information discovery protocol environment can be identified.

After identifying the presence of the asset including the video feed, the controller 412 of the tractor 410 uses the dynamic information discovery protocol to identify static data of the video feed, including a geospatial location of the camera, and the relative position of the camera 432 and the tractor 410/trailer 420 combination in a "Determine Position and Orientation of Video Feed" step 520. The position and orientation of the video feed is stored within the master asset identifier of the identified asset and can be retrieved using the process outlined above with regards to FIGS. 1-3.

Once the geospatial position and orientation of the camera originating the feed is determined, the controller 412 employs an object detection system to detect the presence of hazards 450 as well as the docks 436 within the view of the video feed in an "Employ Object Detection" step 530. In one example, the object detection is performed using a convolutional neural network trained to detect objects based on image analysis. In alternative embodiments, alternative image analysis techniques can be used to similar effect. Once an object is detected in a given frame, the controller 412 determines a distance between the tractor 410, or the trailer 420 and the object in a "Determine Distance to Object" step 540. In some examples, the distance is determined as the shortest distance between the object and the tractor 410 or trailer 420. In other examples, the movement of the tractor trailer is factored in, and the determined distance is a distance between the object and an intersection with the projected path of the tractor 410 or trailer 420. In yet other examples, the step determines the distance between the object and the tractor 410 and/or trailer 420 along an entire edge of the tractor 410 and/or trailer 420.

After identifying the presence of the object, and determining the distance between the tractor 410 and the trailer 420 and the object, the controller 412 adjusts the semi-automated or automated docking maneuver to avoid a path that would cause an intersection (and thus, a collision) with the object and to create a path that properly docks the trailer 420 in an "Adjust Docking Maneuver" step 550. The analysis and adjustment portion is repeated for each frame of the video feed, thereby allowing the controller 412 to continuously adjust for any hazards that may arise during the duration of the docking maneuver. In alternative examples, a similar process can be utilized for any other automated or semi-automated maneuver and the concept is not limited to commercial shipping applications.

With continued reference to the general systems and method of FIGS. 1-5, above, the following describes a more detailed implementation according to one embodiment for use on a vehicle which may potentially interact unsafely with other vehicles/objects/pedestrians during an interaction with a fixed object.

While described herein within the example context of a loading dock and a tractor/trailer combination, it is appreciated that the process can be applied to any similar system(s) within a dynamic information discovery protocol environment such as a loading dock, railcar, or any other similar commercial shipping asset.

In one specific example a vehicle, or similar asset, approaching a dock in a dynamic information discovery protocol environment includes a camera, a camera mount, and a camera housing. The vehicle also includes a controller, or other processor, capable of the analyzing data from the camera and other sensors and responding to that data. The controller includes an algorithm for detecting objects in an image and determining potential interactions with the object based on the camera and sensor data provided to the controller. The controller can be included within the electrical control unit (ECU) of the tractor 410 or provided to the ECU of the vehicle via a direct link from the controller. In one example, the vehicle includes an operator alert system configured to alert the operator of the vehicle when a hazardous object is present. In another example, the vehicle includes a system for adjusting an autonomous or semi-autonomous operation directed by a controller to respond to a detected hazardous object.

The vehicle also includes a remote data link, such as a wireless link provided by a telematics unit. The wireless link is configured to connect to one or more other video or electromagnetic sensors (e.g. ultrasonic, radar, lidar) located remote from the vehicle. As utilized herein, a sensor is remote from the vehicle when the sensor's position is not physically connected to the vehicle (e.g. a drone deployed by the vehicle) or when the sensor is a component of another asset within a dynamic information discovery protocol environment in which the vehicle is a part.

In some examples, the vehicle includes a system allowing for the operator to manually activate a remote information discovery query causing the controller to search a dynamic information discovery protocol environment for relevant sensor sources or deploy a remote sensor (e.g. a drone) from the vehicle allowing for a remote positioning of at least one sensor. In other examples, the finding and utilization of the remote sensor is triggered automatically during operation of one or more vehicle operations. In yet further examples, once the wireless connection has been established, computations such as the object detection processing, distance determining, image preprocessing, or any other computations can be performed remotely and the results transmitted to the vehicle controller for use within the autonomous or semi-autonomous operation.

In one specific implementation, the vehicle includes one or more of a side/rearward facing camera, with the camera(s) operating to replacing side mirrors on the vehicle.

Once the information discovery protocol is activated, a vehicle wireless link determines if trusted sources of video or electromagnetic sensing are available using a dynamic information discovery protocol. In one example, a trusted source of video includes a camera operating on the loading dock pointing at either the rear of the approaching vehicle or along the rear line of the dock so as to provide a view of the leading edge of the dock itself, with enough field of view remaining to allow for a human or machine to have the ability to accurately judge the distance to the edge of the loading dock. A similar video source can also be supplied via a drone or other remote device (such as a smartphone camera). In such an example, the alternate video source can be deployed from the vehicle itself or discovered outside of the dynamic information discovery protocol and function similarly.

Once a trusted video source is located, the video feed is automatically provided to the driver of the vehicle via a split screen display in a mirror replacement system camera display, in combination with the driver cockpit video screen, or on the driver cockpit video screen alone. In alternate examples any alternative display, including dedicated screens, can be utilized to provide the video feed to the driver. In one example, the driver is able to modify the display as desired via a system Human Machine Graphical User Interface. In addition, any active sensor information associated with the video feed can be displayed via a Heads Up Display or other standard numerical display.

Assuming that the height of the camera is greater than the loading height of the dock an object detection system such as a Convolutional neural net is included either inside the camera system, inside the vehicle ECU or remotely located from the vehicle. The Convolutional neural net can then use the information provided by the array of sensors including the remote video feed to identify objects and pedestrians near the vehicle. Alternative examples can use alternative neural network designs to similar effect.

In one example, the camera mounted on the vehicle is mounted at a height sufficient to create a finite stationary horizon in the camera field of view. The camera is positioned in such a way that the field of view of the camera on a flat plane is of a known distance and width relative to the position of the camera. An object may then be detected in the field of view, and the distance to the object estimated, according to the following process.

The exemplary object detection algorithm defined herein uses a Convolutional Neural Network (CNN), as well as an off-line training data set, to train the CNN to detect/identify objects similar to those embodied in the training data set. CNN based training and detection schemes are generally understood in the art. Alternative object detection schemes based on analysis of a current video frame can also be used in alternative examples.

The object detection algorithm examines the entire field of view captured in the video feed on a continuous basis. Relying on only the current frame of a given video feed eliminates potential bias caused by the reliance on previous measurements. In one example, the field of view is divided into a series of sub-rectangles which, as a set, completely contain the entire field of view. Other shapes may be substituted for rectangles in alternative examples as desired/appropriate without departing from the fundamental operations described herein. The data captured from the camera is then provided to the CNN or other object detection algorithm, the output of which gives a probability that there is an object within that particular rectangle within the camera's field of view. In some cases, multiple passes over the field of view with multiple sizes of rectangles is used to refine the object detection algorithm/resulting probabilities.

When the probability that an object has been detected exceeds a predetermined threshold, an object is assumed to have been detected at the position. In order to increase computational efficiency, one example described herein does not identify the type or object in question based on classification data, but rather determines the distance to the object based on the projection of the bottom of the object in the camera field of view into the plane of the road.

The fixed view of the elevated camera results in a stationary horizon relative to the vehicle. The fixed view allows for the distance to the horizon and to the edges of the field of view to be assumed to be invariant. In some examples, a correction factor can be added to account for inclined terrain. The presence of inclined terrain can be determined by vehicle accelerometers, topographical data or other active sensing devices such as ultrasonics, radar, LIDAR according to any known procedure.

Due to the assumed invariance, the bottom line of any object can be placed within the road plane of the vehicle with a transformation of coordinate systems from the viewpoint of the camera to the horizontal plane. For each position of the bottom of a detected object at a position (x, y) within the camera field of view, a corresponding position relative to the vehicle (x1, y1) is calculated by the controller or pre-saved as a part of the calibration process. The transformation can be done mathematically (the calculation), or with a lookup table and then utilizing interpolation techniques between lookup table values (the pre-saved process).

Once an object has been detected, and the distance to the object determined, the computed distance is compared to a threshold value. If the distance to the object is less than the threshold value, then a warning is transmitted to the driver. The warning can be of a visible, audio, or tactile nature, or a combination thereof. Alternatively, in addition to the warning an automated or semi-automated driver assistance system can adjust the docking operation.

In some examples, the included object detection algorithms are highly capable of detecting objects whose features are defined by lines (for example, the edge of a ramp on a loading dock). The included object detection algorithms can be used in conjunction with the internal and external data provided by internal and external sensors to identify the edges of the loading dock, the rear of the loading dock, and other vehicles or people in proximity to the vehicle equipped with the invention. Using this information, along with the camera data, as well as any information available about the location of the cameras/other sensors, the distance to the loading dock from the trailer can be estimated at all points along the length of the trailer. If the estimated distance between the loading dock and the vehicle drops below a certain threshold, then the vehicle ADAS system takes action in response. By way of example, response can include stopping the truck, warning the driver via an alarm, lighted indicators etc., or any other appropriate response.

The information presented to the driver can also be presented in multiple ways depending on the results of the object detection. When a vehicle is docking, the sudden appearance of an obstacle, or an obstacle which is moving within the stationary plane of the road, is likely a pedestrian or other vehicle, making it a priority warning for the driver. As such, if an object is detected where there was not one before, a special warning can be provided to the driver, or the display can be set to show this information in a certain quadrant of the screen or both. Essentially, the current map of probabilities of there being an object within the detection area is compared to previously determined probability maps. If the new probability map has moved in a manner consistent with the kinematic equations governing the relationship between the vehicle and a stationary object, then no additional warning is necessary or provided to the driver. However, if the map of probabilities is not consistent with the kinematic relationship between the motion of the vehicle and the previous map, then an alarm/warning/altered information is provided to the driver.

On examples incorporating an object classification stage where the detected objects are classified into a set of categories (such as pedestrian, vehicle, cone, sign, etc.), the location and type of object identified (object classification) is used to set priorities for which warnings and what information is sent to the driver. For example, the presence of a human near the vehicle would take precedence over the presence of a traffic cone, for example.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for operating a commercial shipping asset comprising:
   entering one of a docking mode for docking a vehicle to a dock and an undocking mode for undocking the vehicle from the dock using a vehicle controller of a commercial shipping asset;
   identifying at least one trusted video source remote from the commercial shipping asset by receiving a master asset identifier from at least one video source, accessing a dynamic information discovery protocol, identifying the at least one video source within the dynamic information discovery protocol using the master asset identifier, and determining that the at least one video source is at least one trusted video source in response to identifying the at least one video source in the dynamic information discovery protocol;
   determining a geospatial position and orientation of the at least one trusted video source from the master asset identifier of the at least one video source;
   determining a distance between the commercial shipping asset and at least one obstacle that is separate from the dock based at least in part on the geospatial position and orientation and an image analysis of a video feed from the trusted video source; and
   responding to the determined distance by performing at least one of providing a warning to an operator of the commercial shipping asset about the obstacle and adjusting an automated or semi-automated operation of the commercial shipping asset in the docking or undocking mode to avoid a collision with the obstacle.

2. The method of claim 1, wherein identifying at least one trusted video source remote from the commercial shipping asset includes deploying a remote video source from the commercial shipping asset.

3. The method of claim 2, wherein the remote video source includes at least one of an automated drone and a fixed position remote camera.

4. The method of claim 1, wherein determining the distance between the commercial shipping asset and the at least one object includes determining a shortest distance between the commercial shipping asset and the at least one object.

5. The method of claim 1, wherein determining the distance between the commercial shipping asset and the at least one object includes determining the distance between the object and the commercial shipping asset along an entire edge of the commercial shipping asset.

6. The method of claim 1, further comprising identifying at least one object in the video feed from the trusted video source using an image analysis tool.

7. The method of claim 6, wherein the image analysis tool includes a convolutional neural network analysis of the image feed.

8. The method of claim 6, wherein the image analysis tool omits classification of detected objects.

9. The method of claim 1, wherein responding to the determined distance comprises providing at least one of an auditory and a visual warning to an operator of the commercial vehicle asset when the determined distance is below a threshold distance.

10. The method of claim 1, wherein responding to the determined distance comprises automatically adjusting the at least one of the automated or semi-automated operation of the commercial shipping asset in the docking or undocking mode to avoid a collision with the obstacle.

11. The method of claim 1, wherein determining the distance between the commercial shipping asset and the at least one obstacle based at least in part on the geospatial position and orientation and image analysis of the video feed from the trusted video source is performed by one of the remote video source, the commercial shipping asset, and a remote processor communicatively coupled to the commercial shipping asset.

12. A commercial shipping asset comprising:
   an asset controller having a processor and a memory, wherein the asset controller is configured to discover and connect to at least one remote video source by:
      receiving a master asset identifier from at least one video source,
      accessing a dynamic information discovery protocol,
      identifying the at least one video source within the dynamic information discovery protocol using the master asset identifier,
      determining that the at least one video source is at least one trusted video source in response to identifying the at least one video source in the dynamic information discovery protocol, and determining a geospatial position and orientation of the at least one trusted video source from the master asset identifier of the at least one video source, the memory further storing instructions for causing the controller to:

determine a distance between the commercial shipping asset and at least one obstacle based at least in part on the geospatial position and orientation and an image analysis of a video feed from the trusted video source, and responding to the determined distance by performing at least one of providing a warning to an operator of the commercial shipping asset about the obstacle and adjusting an automated or semi-automated operation of the commercial shipping asset in the docking or undocking mode to avoid a collision with the obstacle.

13. The commercial shipping asset of claim 12, wherein the remote video source is a component of the commercial shipping asset and is configured to provide a fixed field of view.

14. The commercial shipping asset of claim 12, wherein the remote video source is a distinct asset from the commercial shipping asset, and wherein both the commercial shipping asset and the remote video source are within a dynamic information discovery protocol environment.

15. The commercial shipping asset of claim 12, wherein the asset controller includes at least one of an automated docking system and a semi-automated docking assist system, said at least one of an automated docking system and a semi-automated docking assist system at least partially providing said docking or undocking mode, and wherein the controller is configured to adjust operations of the one of the automated docking system and the semi-automated docking assist system in response to the determined distance.

16. The commercial shipping asset of claim 12, wherein the asset controller further includes an image analysis tool configured to identify the at least one object in the video feed without the utilization of historical positioning.

17. The commercial shipping asset of claim 16, wherein the image analysis tool is a convolutional neural network.

18. The commercial shipping asset of claim 16, wherein the image analysis tool omits classification of identified objects.

19. The method of claim 1, wherein the master asset identifier defines metadata of the at least one video source, including a manifest of data elements that the at least one video source has available, and including a descriptor of the source from which each data element is derived.

20. The method of claim 19, wherein the master asset identifier comprises a computer readable plaque including a universal resource locator (URL) where a full master asset identifier of the at least one video source is available.

21. The method of claim 19, wherein the master asset identifier is actively transmitted from a controller of the at least one video source.

* * * * *